US010285023B2

(12) United States Patent
Bendi et al.

(10) Patent No.: US 10,285,023 B2
(45) Date of Patent: May 7, 2019

(54) METHOD AND DEVICE FOR DIFFERENTIATING THIRD PARTY MESSAGING SERVICES

(71) Applicant: Verizon Patent and Licensing Inc., Arlington, VA (US)

(72) Inventors: Sethumadhav Bendi, Walnut Creek, CA (US); Trevor A. MacDonald, Hurst, TX (US); Lodema M. Steinbach, Clayton, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 53 days.

(21) Appl. No.: 15/596,794

(22) Filed: May 16, 2017

(65) Prior Publication Data
US 2018/0338226 A1  Nov. 22, 2018

(51) Int. Cl.
| | | |
|---|---|---|
| *H04W 4/14* | (2009.01) | |
| *H04W 4/18* | (2009.01) | |
| *H04L 29/06* | (2006.01) | |

(52) U.S. Cl.
CPC ............... *H04W 4/14* (2013.01); *H04L 69/22* (2013.01); *H04W 4/18* (2013.01); *H04L 65/1006* (2013.01)

(58) Field of Classification Search
None
See application file for complete search history.

(56) References Cited

U.S. PATENT DOCUMENTS

| | | | | |
|---|---|---|---|---|
| 2003/0073440 A1* | 4/2003 | Mukherjee | .............. | H04L 29/06 455/435.1 |
| 2008/0307519 A1* | 12/2008 | Curcio | ................ | H04L 63/0227 726/15 |
| 2012/0009916 A1* | 1/2012 | Prikowitsch | ...... | G06F 17/30578 455/422.1 |
| 2014/0007209 A1* | 1/2014 | Zucker | .................. | H04W 12/06 726/7 |
| 2016/0323725 A1* | 11/2016 | Lew | ......................... | H04W 4/14 |
| 2017/0237822 A1* | 8/2017 | Kahn | ...................... | H04L 67/20 709/206 |

OTHER PUBLICATIONS

Wikipedia, "SMS", https://en.wikipedia.org/wiki/SMS#Application-to-person_.28A2P.29_SMS, May 8, 2017, 9 pages.

* cited by examiner

*Primary Examiner* — Xavier Szewai Wong (57) ABSTRACT

A device may receive a message from a third party messaging server device. The message may be destined for one or more user devices. The message may include a parameter that includes information related to the message. The device may determine that the message is an application-to-person ("A2P") message type based on the message being received from the third party messaging server device. The device may configure a value of the parameter based on determining that the message is the A2P message type. The device may provide the message to a user device, of the one or more user devices, or an inter-carrier server device after configuring the value of the parameter.

20 Claims, 5 Drawing Sheets

METHOD AND DEVICE FOR DIFFERENTIATING THIRD PARTY MESSAGING SERVICES

BACKGROUND

Application-to-person (A2P) short message service (SMS) may include a type of SMS where an SMS message is sent from a subscriber to an application or from an application to a subscriber. Organizations, such as financial institutions, airlines, hotel booking sites, social networks, and/or the like may use A2P SMS to send messages to customers. A2P is a different type of SMS from person-to-person (P2P) SMS, where, for example, messages are exchanged between devices (e.g., mobile devices), rather than to or from an application.

DETAILED DESCRIPTION OF PREFERRED EMBODIMENTS

The following detailed description of example implementations refers to the accompanying drawings. The same reference numbers in different drawings may identify the same or similar elements.

Application-to-person (A2P) messaging may include the use of identifiers for exchanging messages between an application and a device (e.g., a user device, a server device, and/or an inter-carrier server device). In some cases, the identifier may have the same quantity of alphanumeric characters as an identifier used for person-to-person (P2P) messaging and/or may otherwise be similar to an identifier used for P2P messaging. This may prevent a device from differentiating between an A2P message and a P2P message, thereby preventing the device from servicing an A2P message. In addition, A2P messages may have characteristics similar to spam messages (e.g., a threshold quantity sent during a time period) which might result in the messages being directed to a spam filter rather than being routed to an end user. The device may lack a technique for differentiating between particular A2P messages that need to be filtered (e.g., by a spam filter) and other A2P messages that do not need to be filtered.

Some implementations, described herein, provide a device (e.g., a server device) that is capable of determining whether an A2P message is from a third party messaging server device and configuring a value of a parameter included in the A2P message that identifies the A2P message as a particular type of A2P message so that another device (e.g., a user device, a server device, or an inter-carrier server device) that receives the A2P message can differentiate between particular A2P messages and identify A2P messages that are to be filtered and A2P messages that are to be delivered to an end user. In this way, the device may permit the other device to quickly and efficiently differentiate between A2P messages, such as from a third-party messaging service, and other types of messages (e.g., P2P messages), using a value of a parameter included in the A2P message that identifies the A2P message as an A2P message type (e.g., relative to using a content-based filtering rule or filtering software to differentiate between types of messages).

This improves performance of the other device by improving filtering of A2P messages by the other device and/or permits the device, or the other device, to provide a particular service based on the type of message. In addition, the device may reduce or eliminate errors by the other device related to filtering messages via use of a parameter value that accurately identifies different types of A2P messages, thereby conserving computing resources of the device and/or the other device that would otherwise be used to send and/or receive an A2P message after the A2P message has been erroneously filtered. Further, this conserves network resources, such as bandwidth, that would otherwise be consumed during delivery of an A2P message that was intended to be filtered by improving accuracy of filtering by the device or the other device. Further, this improves security of the device or the other device via improved accuracy of filtering by the device or the other device.

Figure 1A:
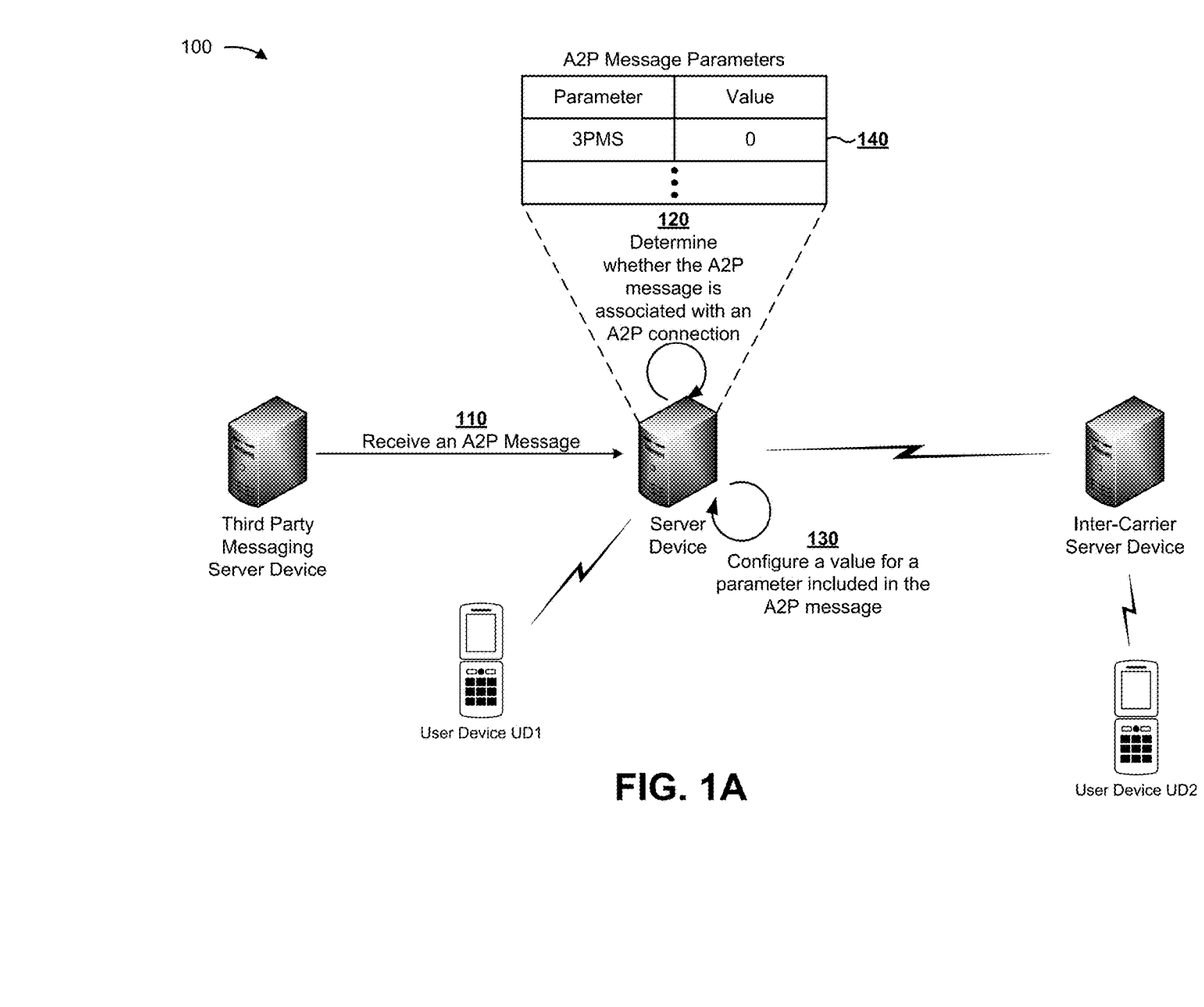
FIGS. 1A and 1B are diagrams of an overview of an example implementation described herein.
Figure 1B:
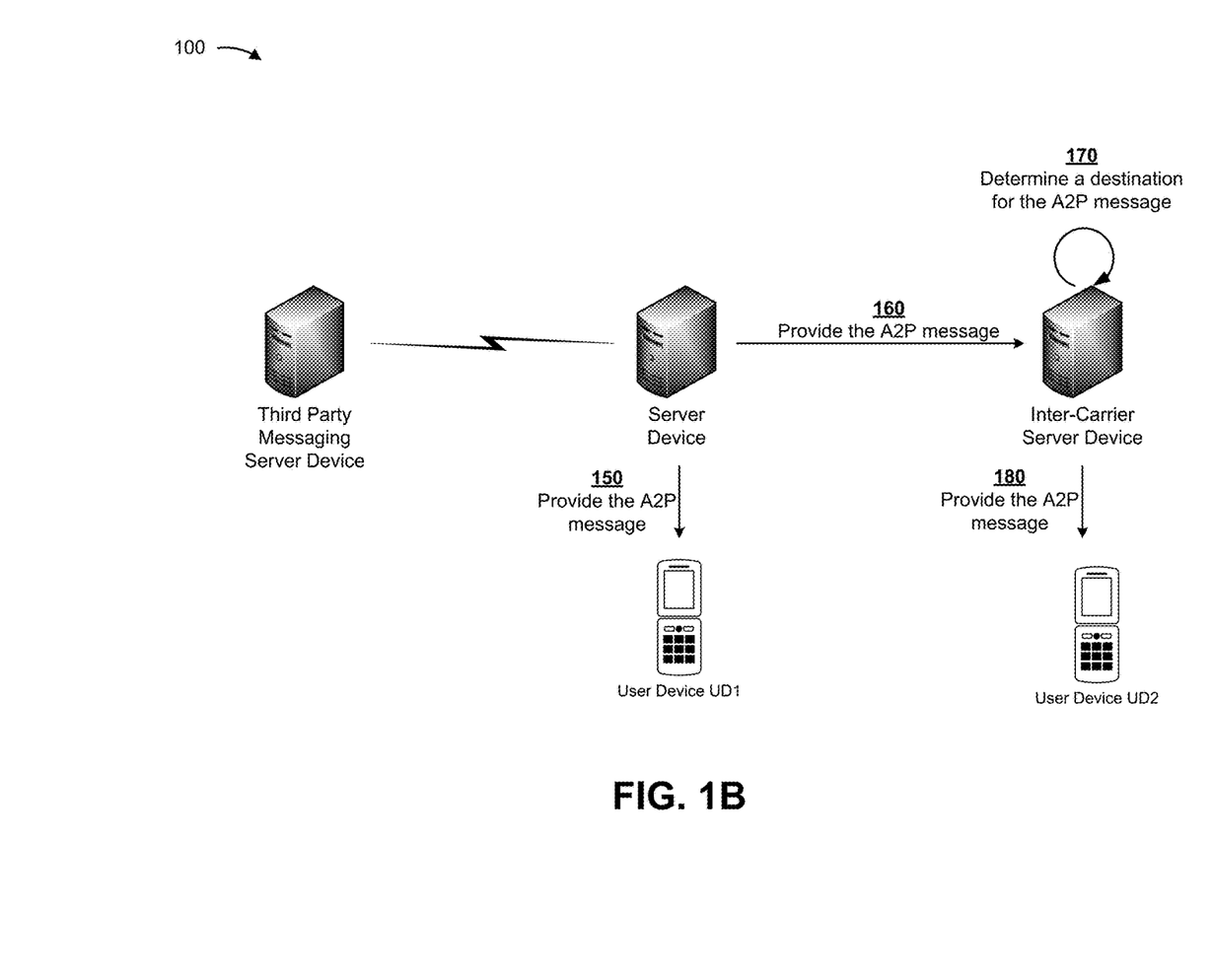

FIGS. 1A and 1B are diagrams of an overview of an example implementation 100 described herein. Example implementation 100 will be described in the context of A2P messaging (e.g., A2P SMS messaging and/or A2P multimedia messaging service (MMS) messaging). The examples described with respect to example implementation 100 apply equally to other types of messaging services (e.g., P2P messaging) and/or to other types of messages (e.g., an email message, an instant message, etc., rather than an SMS or an MMS message). As shown in FIG. 1A, example implementation 100 includes a third party messaging server device, a server device, an inter-carrier server device, user device UD1, and user device UD2.

As shown in FIG. 1A, and by reference number 110, the server device may receive an A2P message (e.g., an A2P SMS message or an A2P MMS message) from the third party messaging server device. For example, the A2P message may be sent from an application hosted on a device associated with an organization (e.g., a financial institution, an airline, etc.) and may be destined for user devices UD1 and/or UD2. As shown by reference number 120, the server device may determine whether the A2P message is associated with an A2P connection. For example, the server device may determine that the A2P message is associated with an A2P connection based on information associated with the message that identifies a source of the A2P message, a type of connection between the server device and the third party messaging server device, and/or the like.

As shown by reference number 130, the server device may configure a value for a parameter included in the A2P message. For example, the server device may configure a value for a parameter that indicates whether the A2P message is from a third party application (e.g., distinguishes the A2P message from a P2P message), whether the A2P message is a group A2P message, whether a received message is a P2P message (e.g., in a case where the server device receives a P2P message rather than an A2P message), and/or the like.

As shown by reference number 140, the server device may configure a parameter that indicates the A2P message is from a third party messaging service (e.g., shown as "3PMS") with a value of zero ("0") or any other indicator or value, thereby indicating that the A2P message is from a third party messaging service. In this way, server device 220 may differentiate a message associated with a third party messaging service (or from a third party messaging server device) from messages associated with other types of services and/or from other types of devices.

As shown in FIG. 1B, and by reference number 150, the server device may provide the A2P message to user device UD1 (e.g., when user device UD1 is associated with the same network, carrier, and/or service provider as the server device). User device UD1 may identify the A2P message as being an A2P message based on the value for the third party messaging service parameter that the server device configured. This may permit user device UD1 to perform a service on the A2P message, prevent the A2P message from being filtered, provide the A2P message for display, and/or the like. In some cases, the server device may provide the A2P message to an inter-carrier server device when a destination device for the A2P message is associated with a different network, a different carrier, and/or a different service provider than the server device.

As shown by reference number 160, the server device may provide the A2P message to the inter-carrier server device. For example, the inter-carrier server device may deliver the A2P message to a user device associated with a different network, a different service provider, and/or a different carrier than the server device (e.g., user device UD2). As shown by reference number 170, the inter-carrier server device may determine a destination for the A2P message using information associated with the A2P message that identifies the destination of the A2P message. As shown by reference number 180, the inter-carrier server device may provide the A2P message to user device UD2. User device UD2 may perform an action similar to that described above with respect to user device UD1.

In some implementations, the A2P message that user device UD2 receives may have the same value configured for the parameter as the A2P message that user device UD1 receives. Conversely, based on user device UD2 being associated with a different network, a different service provider, and/or a different carrier than the server device, the A2P message that user device UD2 receives may have a different value configured for the parameter than the A2P message that user device UD1 receives.

In this way, some implementations, described herein, may permit quick and efficient differentiation between third party A2P messages and other types of messages (e.g., P2P messages), thereby improving performance of a user device via an improvement to filtering of A2P messages by the user device (or an inter-carrier server device) and/or thereby permitting the user device, the server device, and/or the inter-carrier server device to provide a particular service based on the type of message. In addition, some implementations may reduce or eliminate errors related to filtering messages, thereby conserving computing resources of the server device, the user device, and/or the inter-carrier server device that would otherwise be used to send and/or receive an A2P message after the A2P message has been erroneously filtered.

As indicated above, FIGS. 1A and 1B are provided merely as an example. Other examples are possible and may differ from what was described with regard to FIGS. 1A and 1B.

Figure 2:
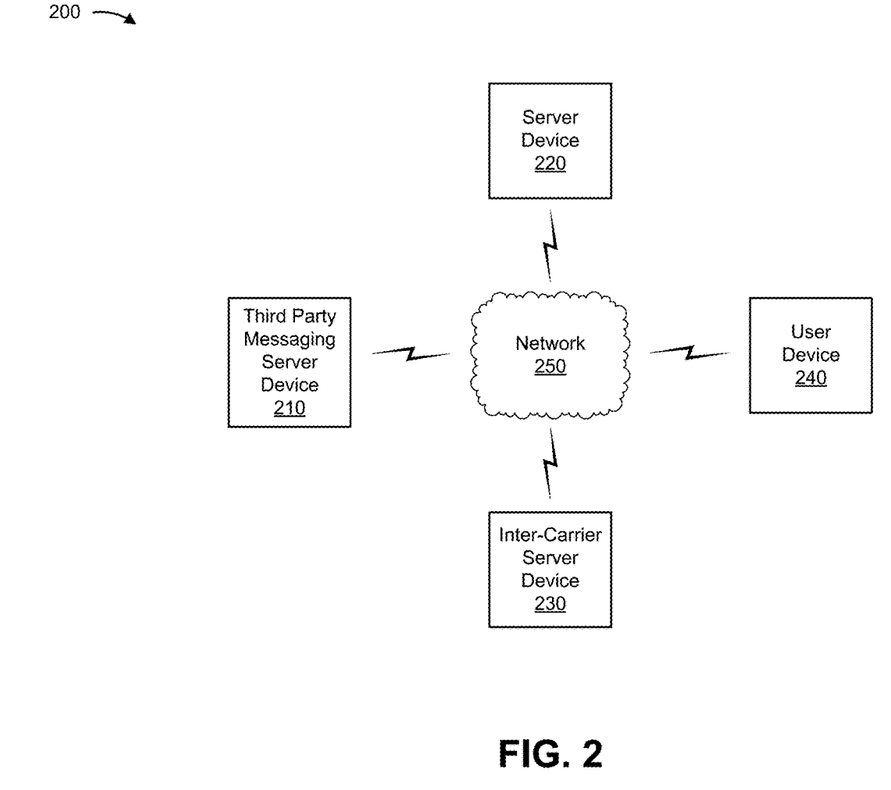
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include third party messaging server device 210, server device 220, inter-carrier server device 230, user device 240, and network 250. Devices of environment 200 may interconnect via wired connections, wireless connections, or a combination of wired and wireless connections.

Third party messaging server device 210 includes one or more devices capable of receiving, generating, storing, processing, and/or providing information associated with an A2P message. For example, third party messaging server device 210 may include a server (e.g., in a data center or a cloud computing environment), a data center (e.g., a multi-server micro data center), a workstation computer, a virtual machine (VM) provided in a cloud computing environment, or a similar type of device. In some implementations, third party messaging server device 210 may host an application that provides an A2P message toward user device 240, as described elsewhere herein. Additionally, or alternatively, third party messaging server device 210 may provide information identifying a source of an A2P message, a type of connection via which the A2P message was provided, and/or the like, as described elsewhere herein. In some implementations, third party messaging server device 210 may be associated with a service (e.g., a third party messaging service), as described elsewhere herein.

Server device 220 includes one or more devices capable of receiving, generating, storing, processing, and/or providing information associated with an A2P message. For example, server device 220 may include a server (e.g., in a data center or a cloud computing environment), a data center (e.g., a multi-server micro data center), a workstation computer, a virtual machine (VM) provided in a cloud computing environment, a short message service center (SMSC), a multimedia messaging service center (MMSC), a simple mail transfer protocol (SMTP) gateway, or a similar type of device. In some implementations, server device 220 may receive an A2P message from third party messaging server device 210, as described elsewhere herein. Additionally, or alternatively, server device 220 may configure a value of a parameter included in the A2P message, as described elsewhere herein. In some implementations, server device 220 may be associated with a carrier different than inter-carrier server device 230, as described elsewhere herein.

Inter-carrier server device 230 includes one or more devices capable of receiving, generating, storing, processing, and/or providing information associated with an A2P message. For example, inter-carrier server device 230 may include a server (e.g., in a data center or a cloud computing environment), a data center (e.g., a multi-server micro data center), a workstation computer, a virtual machine (VM) provided in a cloud computing environment, an SMSC, an MMSC, an SMTP gateway, or a similar type of device. In some implementations, inter-carrier server device 230 may receive an A2P message from server device 220, as described elsewhere herein. Additionally, or alternatively, inter-carrier server device 230 may determine a destination of the A2P message and may provide the A2P message to the destination, as described elsewhere herein. In some implementations, inter-carrier server device 230 may be associated with a carrier different than server device 220 (e.g., inter-carrier server device 230 may provide connectivity between two or more networks), as described elsewhere herein.

User device 240 includes one or more devices capable of receiving, generating, storing, processing, and/or providing information associated with an A2P message. For example, user device 240 may include a desktop computer, a mobile phone (e.g., a smart phone or a radiotelephone), a laptop computer, a tablet computer, a gaming device, a wearable communication device (e.g., a smart wristwatch or a pair of smart eyeglasses), or a similar type of device. In some implementations, user device 240 may receive an A2P message from server device 220 or inter-carrier server device 230, as described elsewhere herein. Additionally, or alternatively, user device 240 may perform an action related to the A2P message based on a value of a parameter included in the A2P message, as described elsewhere herein.

Network 250 includes one or more wired and/or wireless networks. For example, network 250 may include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
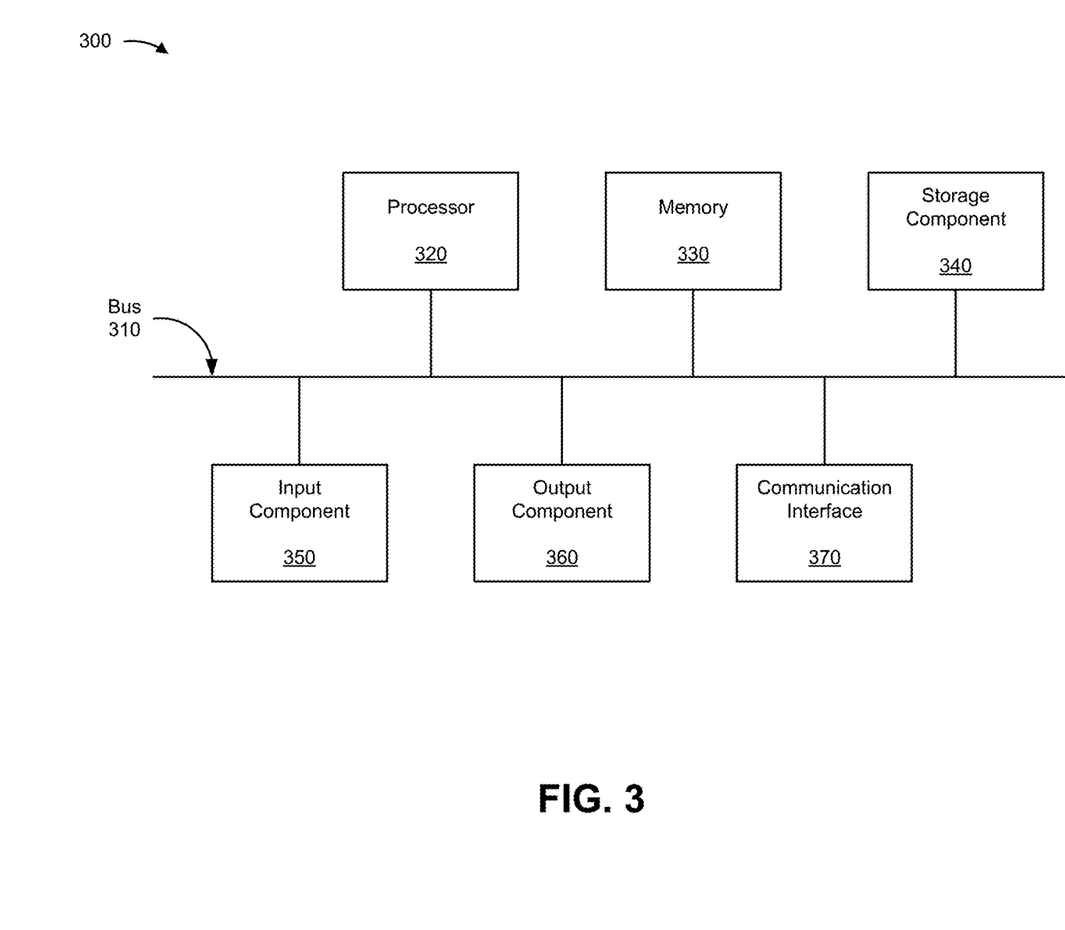
FIG. 3 is a diagram of example components of one or more devices of FIG. 2.

FIG. 3 is a diagram of example components of a device 300. Device 300 may correspond to third party messaging server device 210, server device 220, inter-carrier server device 230, and/or user device 240. In some implementations, third party messaging server device 210, server device 220, inter-carrier server device 230, and/or user device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
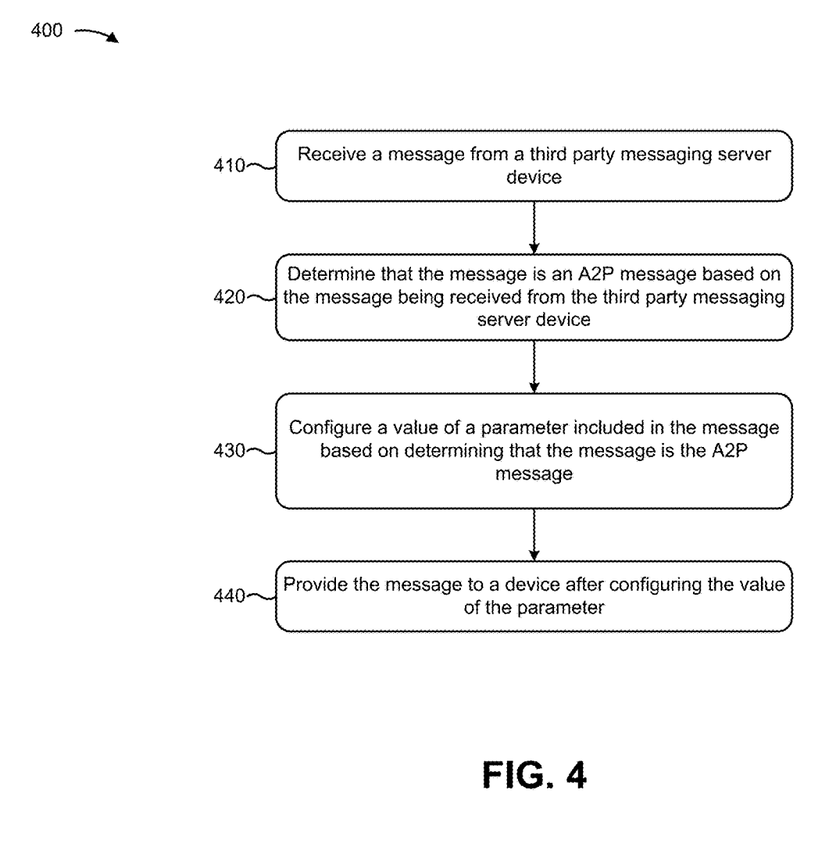
FIG. 4 is a flow chart of an example process for differentiating third party messaging services.

FIG. 4 is a flow chart of an example process 400 for differentiating third party messaging services. In some implementations, one or more process blocks of FIG. 4 may be performed by server device 220. In some implementations, one or more process blocks of FIG. 4 may be performed by another device or a group of devices separate from or including server device 220, such as third party messaging server device 210, inter-carrier server device 230, and/or user device 240.

As shown in FIG. 4, process 400 may include receiving a message from a third party messaging server device (block 410). For example, server device 220 may receive an A2P SMS message, an A2P MMS message, and/or an A2P group message from third party messaging server device 210. An A2P message may include a message sent between an application hosted on a device (e.g., third party messaging server device 210) and another device. In some implementations, server device 220 may receive the message periodically, according to a schedule, based on requesting the A2P message (or based on forwarding a request for the message from another device), based on user input from a user of third party messaging server device 210, and/or the like.

In some implementations, server device 220 may receive a message other than an A2P message. For example, server device 220 may receive a person-to-person (P2P) message sent from a device (e.g., rather than an application). Additionally, or alternatively, and as another example, server device 220 may receive an email message, an instant message, and/or the like. In some implementations, the message may be associated with a protocol. For example, the message may be associated with simple mail transfer protocol (SMTP), post office protocol (POP), and/or the like.

In some implementations, the message may be associated with a set of parameters that contains metadata for the message, routing information for the message, and/or information that indicates a manner in which the message is to be processed by a device. For example, a value for a parameter may identify a source of the message, a destination of the message, whether the message is from a third party messaging service, a size of the payload of the message, and/or the like.

In this way, server device 220 may receive a message from third party messaging server device 210.

As further shown in FIG. 4, process 400 may include determining that the message is an A2P message based on the message being received from the third party messaging server device (block 420). For example, server device 220 may determine that the message is an A2P message based on determining whether the message is from third party messaging server device 210 or from another device (e.g., inter-carrier server device 230 and/or user device 240).

In some implementations, server device 220 may determine whether the message is from third party messaging server device 210 or from another device using information associated with the message (e.g., based on a value for a parameter included in the message). For example, server device 220 may determine that the message is from third party messaging server device 210 using information identifying a source of the message, a type of connection via which the message was received (e.g., a connection with an application), and/or the like.

This may permit server device 220 to quickly and efficiently determine that the message is an A2P message based on determining that the message is from third party messaging server device 210 relative to communicating with another device to determine whether the message is from third party messaging server device 210. In addition, this may permit server device 220 to determine whether the message is from third party messaging server device 210 or from another device without using locally stored information, thereby conserving memory resources of server device 220.

In this way, server device 220 may determine that the message is an A2P message based on the message being received from third party messaging server device 210.

As further shown in FIG. 4, process 400 may include configuring a value of a parameter included in the message based on determining that the message is the A2P message (block 430). For example, server device 220 may configure a value of a parameter included in the message that identifies the message as a particular type of message. In some implementations, the parameter may indicate whether the message is from a third party messaging service, a type of an A2P message (e.g., SMS, MMS, or group), that a received message is an A2P message, that the message was received via an A2P connection, and/or the like. In some implementations, when server device 220 receives a P2P message rather than an A2P message, server device 220 may configure the value for the parameter to indicate that the received message is a P2P message rather than an A2P message.

In some implementations, and as an example, when server device 220 configures a value for a parameter included in an SMS message (e.g., an A2P SMS message parameter in a header of the A2P SMS message), server device 220 may configure a type-length-value (TLV) element. In some implementations, and as another example, when server device 220 configures a value for a parameter included in an MMS message (e.g., an A2P MMS message parameter in a header of the A2P MMS message), server device 220 may configure a value for an "X-Mms-" type header (e.g., referred to as an "X-header"). In some implementations, the value may include an alphanumeric string (e.g., "0," "1," "2," etc.).

In some implementations, the value may be associated with an action to be performed with respect to the message and/or may indicate a manner in which the message is to be processed by a device that receives the message from server device 220. For example, a particular value may indicate that the message is to be sent to inter-carrier server device 230, an application hosted on user device 240, and/or the like. Additionally, or alternatively, and as another example, the value may indicate to the destination device (e.g., user device 240) whether to provide the message for display, filter the message, and/or the like. In this way, server device 220 may configure a value for a parameter that permits another device to quickly and easily identify an action to be performed with respect to the message, thereby increasing an efficiency of determining an action to be performed.

In some implementations, when configuring the value, server device 220 may configure a protocol header with information related to the message. For example, server device 220 may configure a session initiation protocol (SIP) header with an identifier that identifies a source of the message. Continuing with the previous example, assume that the message is from an organization named "First City Bank."

In this example, server device 220 may configure a SIP header with the text "First City Bank," or an identifier that indicates the text when looked up in a data structure, so that when the destination device receives the message, the destination device can provide the text "First City Bank" for display rather than another alphanumeric source identifier, such as "7098645332." In this way, server device 220 may permit a device to provide a source identifier for display that is more quickly and/or easily understood by a user of user device 240 relative to other information that identifies the source of the message, thereby improving a customer experience when receiving a message (e.g., an A2P message).

In this way, server device 220 may configure the value of the parameter included in the message based on determining that the message is the A2P message.

As further shown in FIG. 4, process 400 may include providing the message to a device after configuring the value of the parameter (block 440). For example, server device 220 may provide the message to inter-carrier server device 230 and/or user device 240 based on the value of the parameter. In some implementations, server device 220 may provide the value for the parameter to inter-carrier server device 230 and/or user device 240 (e.g., when server device 220 provides the message).

In some implementations, server device 220 may determine a destination for the message using information associated with the message that identifies a destination of the message. For example, server device 220 may determine the destination for the A2P message based on the value for the parameter. Continuing with the previous example, server device 220 may determine the destination based on the value of the parameter being "0," "1," "2," etc. Continuing still with the previous example, and for an A2P SMS message, server device 220 may provide the A2P SMS message to inter-carrier server device 230 when the value of a TLV element is "0." Additionally, or alternatively, and as another example for an A2P MMS message, server device 220 may provide the A2P MMS message to inter-carrier server device 230 when the value of an "X-Mms-" type header is "0."

In some implementations, server device 220 may provide the message to inter-carrier server device 230 when the message is destined for a particular user device 240 associated with a different network 250 than server device 220 (e.g., user device 240 associated with a different wireless carrier than server device 220), such as to permit inter-carrier server device 230 to provide the message to user device 240. Conversely, in some implementations, server device 220 may provide the message directly to user device 240 when the message is destined for user device 240 associated with the same network 250 as server device 220.

In some implementations, server device 220 may perform another action related to the message. For example, server device 220 may record a metric associated with the message, such as a quantity of destination devices to which the message is destined, an amount of bandwidth that the message is consuming, and/or the like. In some implementations, server device 220 may generate a report that includes a value of the metric. Additionally, or alternatively, server device 220 may send the report and/or a message related to the report to user device 240 (e.g., associated with a network administrator). Additionally, or alternatively, server device 220 may trigger an alarm, or send a message, when a value of the metric satisfies a threshold.

In some implementations, inter-carrier server device 230 and/or user device 240 may perform an action after receiving the message. For example, user device 240, or an application hosted on user device 240, may process an A2P message (e.g., by processing a SIP header associated with an A2P SMS message, an MMS header associated with an A2P MMS message, the configured value, etc.) and may provide the A2P message for display. Additionally, or alternatively, and as another example, inter-carrier server device 230 and/or user device 240 may filter the A2P message using a spam filter policy (e.g., based on the configured value of a TLV element associated with an A2P SMS message or the configured value of an "X-Mms-" type header associated with an A2P MMS message).

In some implementations, server device 220, inter-carrier server device 230, and/or user device 240 may filter the A2P message to prevent reception of a potentially harmful and/or unwanted A2P message. For example, after server device 220 has determined that a message is an A2P message, server device 220, inter-carrier server device 230, and/or user device 240 may determine whether the A2P message is from an approved third party messaging server device 210 (e.g., using information, such as a whitelist, that identifies a particular third party messaging server device 210, an application, a third party messaging service, etc. that provided the A2P message). This conserves processing resources that would otherwise be consumed by receiving a potentially harmful and/or unwanted A2P message.

In some implementations, information identifying a set of approved third party messaging server devices 210 (e.g., a whitelist) may be the same or different between server device 220, inter-carrier server device 230, and/or user device 240. In some implementations, when different devices identify different third party messaging server devices 210 on a whitelist, server device 220 may send a message (not the A2P message) to the destination device to request that a user of the destination device input an indication as to whether the user wants to receive the A2P message, may send the A2P message when the third party messaging server device 210 is identified on a whitelist of the destination device, and/or the like.

In this way, server device 220 may provide the message to a device after configuring the value of the parameter.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations were described herein with respect to A2P messages. The implementations apply equally to other types of messages, such as P2P messages. In addition, the implementations apply equally to SMS messages, MMS messages, email messages, instant messages, and/or the like.

Some implementations, described herein, provide a user device that is capable of receiving an A2P message from a third party messaging server device, determining whether the A2P message is from the third party messaging server device or from another device, configuring a value of a parameter included in the A2P message that identifies the A2P message as a particular type of A2P message, and/or providing the A2P message to a device. In this way, the user device may quickly and efficiently differentiate between A2P messages, such from a third party messaging service, and other types of messages (e.g., P2P messages), thereby improving performance of the user device and/or permitting the user device to provide a particular service based on the type of message. In addition, the user device may reduce or eliminate errors related to filtering a message, thereby conserving computing resources that would otherwise be used to send and/or receive an A2P message after the A2P message has been erroneously filtered.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
   receive a message from a third party messaging server device,
      the message being destined for one or more user devices,
      the message including a parameter that includes information related to the message;
   determine that the message is an application-to-person ("A2P") message type based on the message being received from the third party messaging server device;
   configure a value of the parameter based on determining that the message is the A2P message type,
      the value of the parameter being included in a session initiation protocol (SIP) header associated with the message, and
      the value of the parameter distinguishing the message as the A2P message type from a person-to-person (P2P) message type; and
   provide the message to a user device, of the one or more user devices, or an inter-carrier server device after configuring the value of the parameter.

2. The device of claim 1, where the one or more processors are further to:
   determine that the message is a short message service (SMS) message; and
   where the one or more processors, when configuring the value, are to:
      configure the value of a type-length-value (TLV) element associated with the message.

3. The device of claim 1, where the one or more processors are further to:
   determine that the message is a multimedia messaging service (MMS) message; and
   where the one or more processors, when configuring the value, are to:
      configure the value of an X-header associated with the message.

4. The device of claim 1, where the one or more processors are further to:
   determine whether the message is associated with a third party messaging service; and
   where the one or more processors, when configuring the value, are to:
      configure the value to indicate that the message is associated with the third party messaging service.

5. The device of claim 1,
   where the one or more processors, when providing the message, are to:
      provide the message after configuring the SIP header.

6. The device of claim 1, where the one or more processors, when determining that the message is the A2P message type, are to:
   determine that the message is the A2P message type based on:
      another value of another parameter,
      information identifying a source of the message, or
      information identifying a type of a connection between the device and the third party messaging server device,
         the message having been received via the connection.

7. The device of claim 1, where the one or more processors are further to:
   determine a destination of the message based on the value of the parameter; and
   where the one or more processors, when providing the message, are to:
      provide the message to the user device or the inter-carrier server device based on determining the destination of the message.

8. A non-transitory computer-readable medium storing instructions, the instructions comprising:
   one or more instructions that, when executed by one or more processors, cause the one or more processors to:
      receive one or more messages from one or more third party messaging server devices,
         the one or more messages being destined for one or more user devices,
         the one or more messages including one or more parameters that include information related to the one or more messages;
      determine that the one or more messages are an application-to-person ("A2P") message type based on the one or more messages being received from the one or more third party messaging server devices;

configure a value of a parameter, of the one or more parameters, based on determining that the one or more messages are the A2P message type,
    the value of the parameter being included in a session initiation protocol (SIP) header associated with the one or more messages, and
    the value of the parameter distinguishing the one or more messages as the A2P message type from a person-to-person (P2P) message type; and
provide the one or more messages to the one or more user devices or one or more inter-carrier server devices after configuring the value of the parameter.

9. The non-transitory computer-readable medium of claim 8, where the one or more instructions, that cause the one or more processors to configure the value, cause the one or more processors to:
configure a type-length-value (TLV) element associated with the one or more messages.

10. The non-transitory computer-readable medium of claim 8, where the one or more instructions, that cause the one or more processors to configure the value, cause the one or more processors to:
configure an X-header associated with the one or more messages.

11. The non-transitory computer-readable medium of claim 8, where the one or more instructions, when executed by the one or more processors, further cause the one or more processors to:
receive one or more other messages destined for the one or more user devices or the one or more inter-carrier server devices; and
configure one or more other values for the parameter for the one or more other messages,
    the one or more other values indicating that the one or more other messages are:
        one or more person-to-person (P2P) messages,
        one or more short message service (SMS) messages,
        one or more multimedia messaging service (MMS) messages, or
        one or more group messages.

12. The non-transitory computer-readable medium of claim 8, where the one or more instructions, when executed by the one or more processors, further cause the one or more processors to:
determine whether the one or more messages were received via one or more A2P connections; and
where the one or more instructions, that cause the one or more processors to determine that the one or more messages are the A2P message type, cause the one or more processors to:
    determine that the one or more messages are the A2P message type based on determining whether the one or more messages were received via the one or more A2P connections.

13. The non-transitory computer-readable medium of claim 8, where the value indicates that the one or more messages are from one or more third party applications.

14. The non-transitory computer-readable medium of claim 8, where the one or more instructions, when executed by the one or more processors, further cause the one or more processors to:
record one or more metrics associated with the one or more messages in association with providing the one or more messages.

15. A method, comprising:
receiving, by a device, a message from a third party messaging server device,
    the message being destined for one or more user devices,
    the message including a parameter that includes information related to the message;
determining, by the device, that the message is an application-to-person ("A2P") message type based on the message being received from the third party messaging server device;
configuring, by the device, a value of the parameter based on determining that the message is the A2P message type,
    the value of the parameter being included in a session initiation protocol (SIP) header associated with the message, and
    the value of the parameter distinguishing the message as the A2P message type from a person-to-person (P2P) message type; and
providing, by the device, the message to a user device, of the one or more user devices, or an inter-carrier server device after configuring the value of the parameter.

16. The method of claim 15, where configuring the value comprises:
configuring the value to identify a third party associated with the third party messaging server device.

17. The method of claim 15, where configuring the value comprises:
configuring a first value to identify the message as being received from the third party messaging server device associated with a third party messaging service, or
configuring a second value to identify the message as a group message.

18. The method of claim 15, where providing the message comprises:
providing the message to the user device or the inter-carrier server device based on the value of the parameter.

19. The method of claim 15, further comprising:
configuring the SIP header associated with the message to identify the third party messaging server device as a source of the message.

20. The method of claim 15, where the value indicates an application to be used for processing the message,
the application being associated with the user device or the inter-carrier server device.

* * * * *